United States Patent [19]

Weldon et al.

[11] Patent Number: 4,841,217
[45] Date of Patent: Jun. 20, 1989

[54] PULSED GENERATOR INCORPORATING OUTPUT WAVEFORM FLEXIBILITY AND A PULSED TRANSFORMER

[75] Inventors: William F. Weldon; Siddharth B. Pratap; Mircea D. Driga, all of Austin, Tex.

[73] Assignee: The University of Texas System, Austin, Tex.

[21] Appl. No.: 132,596

[22] Filed: Dec. 14, 1987

[51] Int. Cl.⁴ .............................................. H02K 39/00
[52] U.S. Cl. ........................................ 322/8; 310/266; 322/66; 322/100
[58] Field of Search ............................ 322/7, 8, 63–66, 322/100; 310/266

[56] References Cited

U.S. PATENT DOCUMENTS

| | | | |
|---|---|---|---|
| 3,512,074 | 5/1970 | Soper | 322/64 X |
| 3,670,187 | 6/1972 | Thum | 310/10 |
| 4,185,216 | 1/1980 | Mole et al. | 310/178 |
| 4,200,831 | 4/1980 | Weldon et al. | 322/8 |
| 4,355,276 | 10/1982 | Vittay | 322/4 |
| 4,383,215 | 5/1983 | Frister | 322/64 X |
| 4,539,486 | 9/1985 | Saito et al. | 322/90 X |
| 4,633,160 | 12/1986 | Graham | 322/20 |

OTHER PUBLICATIONS

"Design of Compensated Pulsed Alternators with Current Waveform Flexibility," presented at the 6th IEEE Pulsed Power Conference in Arlington, Va., Jun. 29–Jul. 1, 1987.

"Future Trends for Compulsators Driving Railguns," presented at the 3rd Symposium on EML Technology, Apr. 20-24, 1986.

*Primary Examiner*—R. J. Hickey

[57] ABSTRACT

A single phase, multipole alternator with inertial and/or electromagnetic energy storage is disclosed. More specifically, the present invention involves a high energy pulsed alternator which is capable of generating a variety of pulse signals by ready modification of the angle between the magnetic axes of the excitation field coil and the compensating coil or conducting shield.

18 Claims, 2 Drawing Sheets

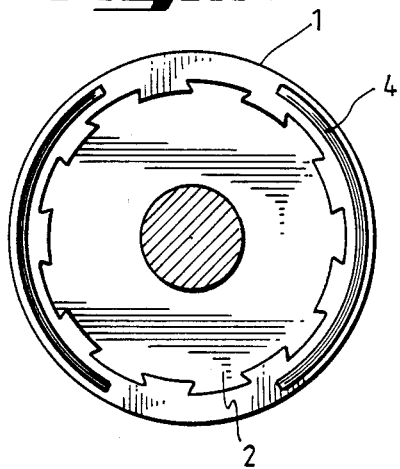
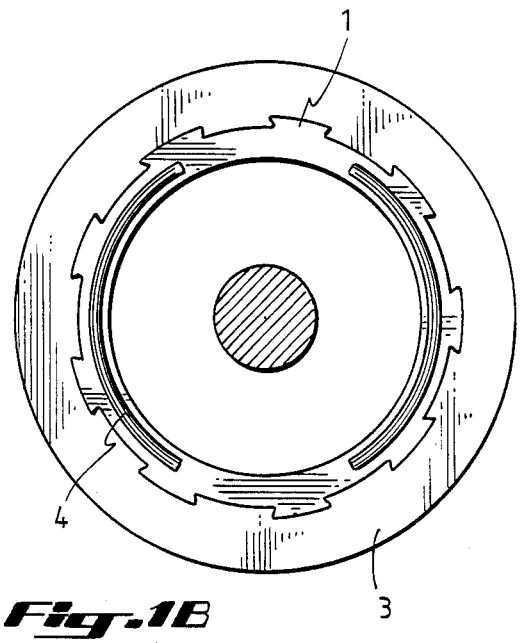
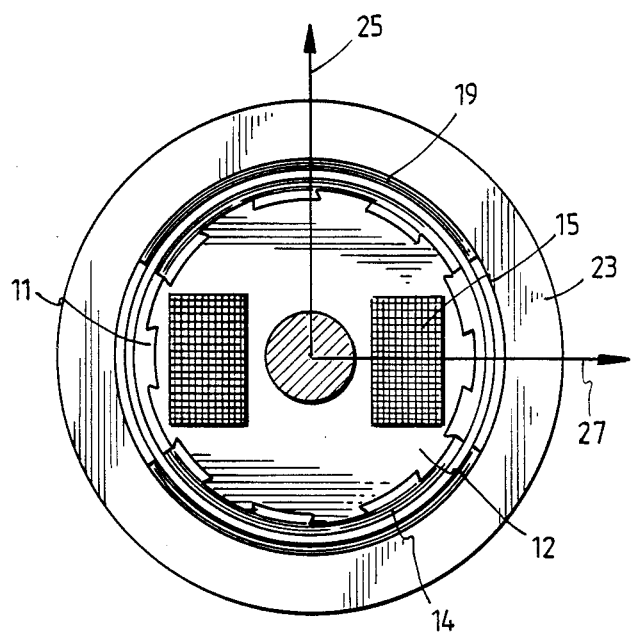
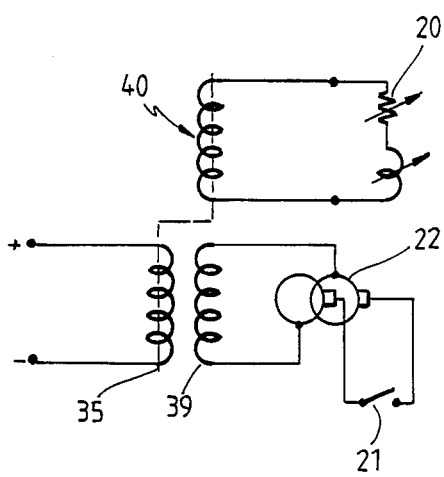

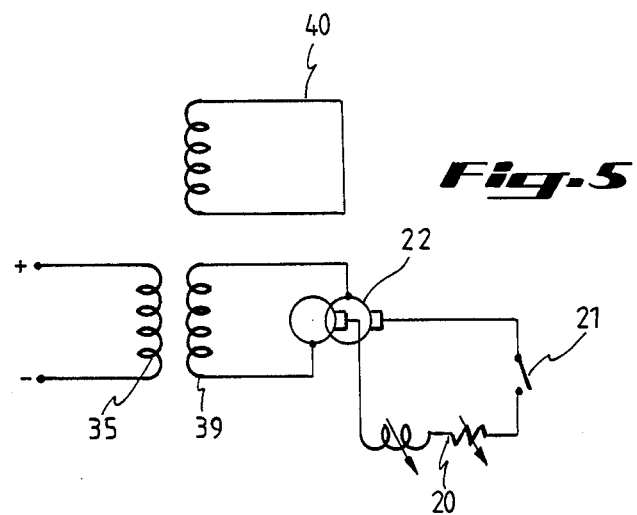
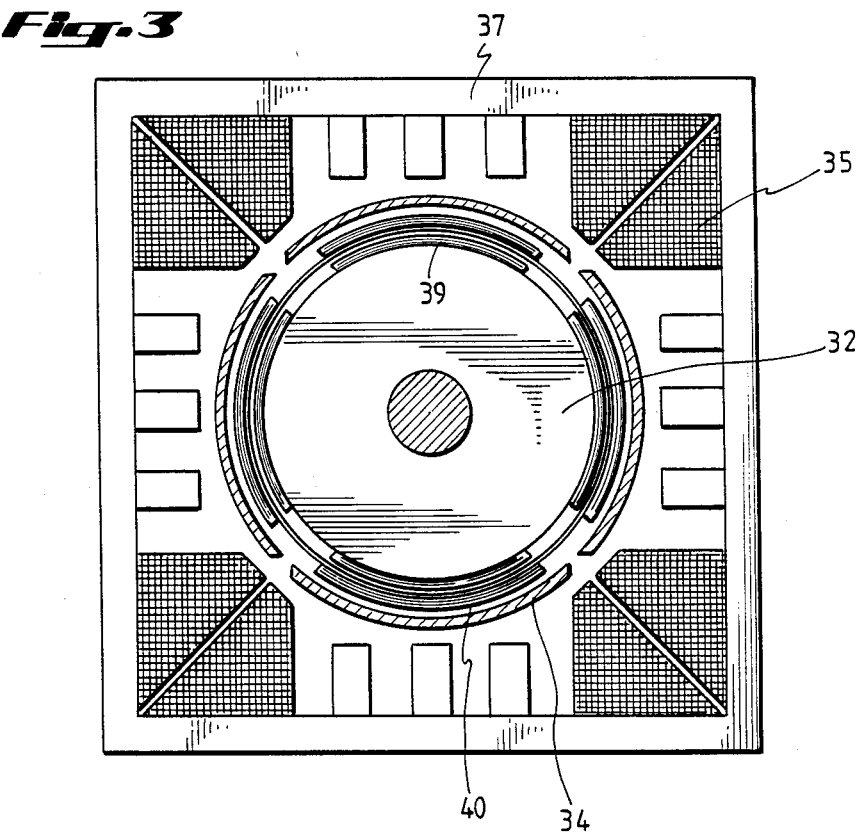

PULSED GENERATOR INCORPORATING OUTPUT WAVEFORM FLEXIBILITY AND A PULSED TRANSFORMER

BACKGROUND

1. Field of the Invention

The present invention relates generally to a pulsed alternator incorporating current waveform flexibility and a pulsed transformer. More specifically, the present device relates to a single phase, multipole alternator with inertial and electromagnetic energy storage through the initially injected current in the compensating winding.

2. Description of the Prior Art

In a variety of applications, including thermonuclear fusion, space technology and certain military countermeasure techniques, there exists a need to provide a train of current pulses to a prescribed load. Preferably, these current pulses need to be of substantial magnitude. Furthermore, these current pulses must have a certain shape with respect to time and in some applications this shape must be variable from load to load and from pulse to pulse.

The development in current pulse technology has at times been hindered by limitations in the development of compatible systems hardware. For example, changes in current pulse shapes have generally been synthesized by electronic circuitry. The use of electronic circuitry, however, imposes limitations on the magnitude of the current pulse due to the inevitable heating of the electronic components of such a system. Rotating electrical apparatuses, therefore, have been limited in their maximum attainable current and/or do not possess the required wave shape flexibility. For example, an alternating current generator as used in grid power systems is limited in the maximum attainable current and power. To address this limitation, the compensated pulsed alternator or compulsator as seen in U.S. Pat. No. 4,200,831-Weldon, et al. was developed. It would be desirable that this alternator have greater waveform flexibility.

Additional limitations addressed by the present invention as a result of incorporating wave shape flexibility include switching. As pulsed alternator applications have necessitated increasingly higher current levels, a major problem that has arisen is the development and design of closing switches to initiate precisely timed current pulse. For high current pulses, these switches tend to be quite large, and in certain cases, require extensive development.

Prior attempts to overcome this problem have employed high voltage, low current generators, stepping up the current of the generator with a pulse transformer, where the closing switch is positioned on the primary of the transformer. However, the use of such generators necessarily implies the undesired existence of an additional component in the system, the pulse transformer. Moreover, these approaches have not permitted output waveform flexibility since the shape of the pulse is predetermined by the variation in time of the generator primary pulse.

SUMMARY OF THE INVENTION

The present invention overcomes the above noted and other disadvantages of prior art systems by providing a pulsed alternator utilizing a rotating electrical setup, where this alternator incorporates a means for wave shape flexibility and an integrated pulse transformer. Further, the pulsed alternator of the present system provides for the generation of a variety of current pulse shapes by the manipulation and adjustment of the angle between the magnetic axis of the excitation field coil and the compensating coil and/or the nonuniform compensating shield, and by the interactions of all of the above with the compensating winding acting as a pulsed transformer.

Structurally, the apparatus of the present invention comprises a field coil excitable by a dc power supply, said coil being positioned on the stator or rotor. In the present system, a single excitation winding or field coil is used, and the current in this coil need not be closely controlled. The armature coil is preferably made of Litz wire or solid copper conductors which are transposed. Said armature coil is mounted on the stator or rotor such that it will have relative motion with respect to the field coil. A compensating coil is also provided in the present system, said coil preferably made of Litz wire or solid copper conductors which are transposed. This compensating coil is placed on the same member as the field coil and results in selective changes in the inductance of the armature coil by flux compression.

A compensating coil is also used when a transformer action and/or wave shaping is desired. In this, the compensating coil can have more or less conductors per pole than the armature winding. Alternately, for only pulse shaping action the compensating coil may be replaced by a conductive shield with pockets or nonconducting or low conductivity material disposed along the peripheral surface of said shield in either a regular or irregular internal arrangement depending on the particular pulse shaping application.

Of particular note in the present invention is the lack of galvanic contact between the armature and the compensating coil. In the present design, coupling between the armature and compensating coils is accomplished solely through the magnetic field or mutual inductance between the coils. In this fashion, the output of the alternator is not limited by the life of brushes or slip rings which are subject to mechanical wear.

The present invention has many advantages over the prior art. One such advantage is the elimination of the need for a separate pulse transformer since the compensating winding coil of the present invention accomplishes the combined functions of flux compression and pulse transformation. Thus, the pulsed alternator of the present invention is capable of a higher power level than prior art devices, and is more compact in terms of volume, weight and overall number of system components. Additionally, the dual role of the compensating coil also enhances waveform flexibility. Furthermore, by changing the relative orientation of the compensating coil with respect to the field coil between pulses, a change in wave shape can be accomplished from pulse to pulse.

The present design significantly enhances the life of a given pulsed alternator since the present invention is free of the constraint of electrically connecting the armature winding and the compensatory windings in series, instead magnetically coupling the two windings to obtain the desired results. Hence and as previously noted, the life of a given alternator is not limited by the mechanical wear of a given electrical connection.

Nominally, the compensating coil comprises a short circuited coil (shorted on itself). However, in order to obtain additional flexibility in wave shape, the terminals of the compensating coil can be connected to an external pulsed power source which is capable of injecting a current pulse into the compensating coil. This injected current can be constant or of a prescribed wave shape. The injected current will act as an independent dipole which can achieve the flux compression and pulse shaping in a more efficient manner and with a time constant less dependent on the excitation structure of the machine.

Finally, the simple yet robust structural configuration of the present device allows for ready modification of the orientation of the magnetic axes between the field winding and the compensation winding which is built and mounted as a separate mechanical entity. Thus in military and similar applications, orientation of the magnetic axes may be modified in the field or at a military depot level operation.

BRIEF DESCRIPTION OF THE DRAWINGS

FIG. 1A is a cross sectional view of the compensating winding when it is fabricated on a separate form prior to assembly on the rotor.

FIG. 1B is a cross sectional view of the compensating winding when it is fabricated on a separate form prior to assembly with the stator.

FIG. 2 is a cross sectional view of the iron-core version of the pulse shaping compulsator with 2 poles.

FIG. 3 is a cross sectional illustration of the aircore version of the present invention utilizing four field poles.

FIG. 4 is a schematic of the embodiment illustrated in FIG. 3 incorporating a pulse transformer.

FIG. 5 is a schematic of the embodiment illustrated in FIG. 3 used as a pulse forming generator.

DETAILED DESCRIPTION OF THE DRAWINGS

FIG. 1A is a cross sectional view of the compensating winding 4 when it is incorporated on a separate form 1 prior to assembly on the rotor 2. FIG. 1B illustrates the same compensating winding 4 for assembly with the stator 3. In both embodiments, the compensating winding 4 may be disposed on a matrix 1, preferably made of a fiber reinforced epoxy material, said matrix dovetailed to engage with the corresponding rotor/stator. Both these embodiments permit incremental changes in the relative orientation of the field coil and compensating coil axes.

FIG. 2 generally illustrates a cross section of the iron-core version of a pulse shaping compulsator, where a rotor 12 having field coils 15 and compensating windings 14, is rotatably disposed within a stator 23 having armature windings 19. The compensating winding 14 is generally comprised of an electrical coil shorted on itself or a nonuniformly conducting shield (not shown). This conductive shield may be formed with pockets of nonconductive or low conductive material. Also in this view may be seen the relative interrelationship of the magnetic axes of the field winding and the compensating winding designated by 25 and 27 respectively. Though in FIG. 2 a two pole field coil 15 is illustrated, it is envisioned that multiple field coils may be used.

FIG. 3 is a cross section of one preferred embodiment of the present invention illustrating the use of a rotor 32 rotatably positioned between field coils 35. In the illustrated embodiment, four fixed field coils 35 are secured to a frame 37. More specifically in this figure, rotor 32 with armature winding 39 is rotatably disposed within a compensating winding 40. The compensating winding 40 is preferably wound and fabricated separately as described in FIG. 1B, but without the dovetailing on the matrix 1. This compensating coil 40 is then mounted on the end plates of the alternator (not shown) utilizing bearings or the like such that said compensating coil 40 is free to rotate about the rotor 32. In this fashion, the rotational freedom of the compensating coil 40 allows adjustment of the relative orientation of the magnetic axes of the compensating coil 40 to the field coil 35. In the "air-cored" embodiment illustrated in FIG. 3, it is possible to continuously change the relative orientation of the magnetic axes of the field and compensating coils, 35 and 40 respectively.

In the embodiment illustrated in FIG. 3, a retaining system ideally comprised of a series of concentric brake shoes 34, is formed about the outside of the compensating winding 40. These brake shoes 34, are pneumatically or hydraulically activated prior to discharge, thus enabling the compensating winding 40 to sustain the discharge torque without rotation. These brake shoes 34 are preferably spaced at regular intervals along the axial length of the alternator.

FIG. 4 illustrates a circuit schematic of the present invention when the pulse transformer action is invoked. This schematic is for the machine as shown in FIG. 3. In this scheme, the load 20 is connected to the compensating coil 40 without a switch. The armature coil 39 is connected to a closing switch 21 through brushes and slip rings 22. The field coil 35 is represented as oriented with respect to armature coil 39. The number of conductors $N_1$ per pole in the armature coil is greater than the number of conductors $N_2$ per pole in the compensating coil 40. Thus when the switch 21 is closed, the current in the armature coil 39 is amplified by the ratio of the number of conductors per pole ($N_2/N_1$) in the compensating coil 40. Therefore with this scheme, switching can be accomplished at lower currents. When the desired pulse shape in time is close to a sinusoidal function, magnetic axes of the compensating coil 40 and field coil 35 are aligned.

FIG. 5 illustrates another circuit schematic of the present invention when only the waveform flexibility is invoked. This schematic is also for a machine as shown in FIG. 3. In this scheme, the load 20 is connected to the armature coil 39, through a switch 21 and brushes and slip rings 22. The compensating coil/non-uniform shield 40 is passive and provides only selective flux compression.

What is claimed is:

1. A pulsed alternator for sequentially supplying short duration pulses of electrical power to a load circuit, where said alternator includes a stator or rotor each having an inner or outer periphery, said alternator comprising:
    an armature coil mounted on the inner or outer periphery of the stator or rotor, said load circuit being connected to said armature coil;
    a field coil mounted on the rotor when the armature coil is on the stator and on the stator when the armature coil is on the rotor;
    a compensating coil mounted about the inner or outer periphery of said stator or rotor, said compensating coil coupled to said armature coil solely by mutual inductance or magnetic coupling, and;
    an external trigger switch coupled between said armature coil and said load circuit, said switch adapted to be periodically and sequentially opened and closed to provide said pulses to said load circuit.

2. The pulsed alternator defined in claim 1 wherein the compensation coil has fewer conductors per pole than the armature coil where the load is connected to the compensating coil and the switch is connected to the armature coil.

3. The pulsed alternator defined in claim 1 further comprising an external pulsed source connected to inject a current pulse into the compensating coil.

4. The pulsed alternator defined in claim 1 including a means for continuously or incrementally varying the angle between the magnetic axis of the field coil and the magnetic axis of the compensating coil.

5. The pulsed alternator defined in claim 1 where the field coil is excitable by a dc power supply.

6. The pulsed alternator defined in claim 1 where the armature is mounted on the rotor or stator such that it is movable relative to the field coil.

7. The pulsed alternator defined in claim 1 wherein the compensating winding is placed on the same member as the field coil.

8. The pulsed alternator defined in claim 7 wherein the compensating coil can selectively change inductance by flux compression.

9. The pulsed alternator defined in claim 1 where the compensating coil is electrically coupled to an external, pulsed power source such that a pulsed or constant current is injected into said coil, thus adding a magnetic storage element to the pulse generator.

10. A pulsed alternator for sequentially supplying short duration, high power pulses of electrical power to a load circuit, where said alternator includes a stator or a rotor having an inner or outer periphery, said alternator comprising:
   an armature coil mounted on the inner or the outer periphery of the stator or rotor;
   a field coil mounted on the rotor when the armature coil is on the stator and on the stator when the armature coil is on the rotor;
   a conductive shield mounted about the inner periphery of said rotor or stator, said conductive shield coupled to said armature solely by mutual inductance or magnetic coupling; and
   an external trigger switch coupled between said armature coil and said load circuit, said switch adapted to be periodically and sequentially opened and closed to provide said pulses to said load circuit.

11. The pulsed alternator defined in claim 10 wherein the shield is comprised of alternating segments of low conducting and nonconducting material spaced at intervals long the periphery of said shield.

12. The pulsed alternator defined in claim 11 wherein the nonconducting and low conducting material is disposed along the peripheral surface of said shield in either a regular or irregular arrangement.

13. The pulsed alternator defined in claim 10 including a means for continuously or incrementally varying the angle between the magnetic axis of the field coil and the magnetic axis of the conductive shield.

14. A pulsed alternator for sequentially supplying short duration pulses of electrical power to a load circuit, where said alternator includes a stator or rotor having an inner or outer periphery, said alternator comprising:
   a compensating coil mounted in the inner or outer periphery of the stator or rotor, said compensating coil being free to rotate relative to said stator or rotor;
   an armature coil rotatably disposed within said compensating coil and coupled to said coil solely by mutual inductance or magnetic couling;
   an external trigger switch coupled between said armature coil and said load circuit, said switch adapted to be periodically and sequentially opened and closed to provide current pulses to the load.

15. The pulsed alternator defined in claim 14 further comprising a retaining system disposed about the outer periphery of the compensating winding to enable said winding to sustain discharge torque without rotation.

16. The pulsed alternator defined in claim 14 further comprising an external pulsed source connected to inject a current pulse into the compensating coil.

17. The pulsed alternator defined in claim 16 where the retaining system comprises a series of concentric brake shoes spaced at regular intervals along the axial length of the alternator.

18. A singlephase, multipole alternator, comprising:
   a rotor member and a stator member;
   an armature winding on one of said members;
   a field winding on the other said member;
   a compensating winding attachable to the same member as the field winding in a circuit separate from the armature winding; the position of the compensating winding being rotatably moveable relative to the position of the field winding.

* * * * *

UNITED STATES PATENT AND TRADEMARK OFFICE
CERTIFICATE OF CORRECTION

PATENT NO. : 4,841,217

DATED : June 20, 1989

INVENTOR(S) : Weldon, et al.

It is certified that error appears in the above-identified patent and that said Letters Patent is hereby corrected as shown below:

Col. 6, line 6, please delete "long" and insert --along--.

Col. 6, line 26, please delete "couling" and insert --coupling--

Signed and Sealed this

Twenty-first Day of August, 1990

Attest:

HARRY F. MANBECK, JR.

*Attesting Officer*     *Commissioner of Patents and Trademarks*